United States Patent
Lin et al.

(10) Patent No.: US 10,374,773 B2
(45) Date of Patent: Aug. 6, 2019

(54) METHOD, SYSTEM AND DEVICE FOR TRANSMITTING FEEDBACK INFORMATION

(75) Inventors: Yanan Lin, Beijing (CN); Zukang Shen, Beijing (CN); Xuejuan Gao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 688 days.

(21) Appl. No.: 14/356,136

(22) PCT Filed: Aug. 8, 2012

(86) PCT No.: PCT/CN2012/079848
§ 371 (c)(1),
(2), (4) Date: Sep. 11, 2014

(87) PCT Pub. No.: WO2013/063966
PCT Pub. Date: May 10, 2013

(65) Prior Publication Data
US 2015/0043452 A1 Feb. 12, 2015

(30) Foreign Application Priority Data
Nov. 2, 2011 (CN) .......................... 2011 1 0341818

(51) Int. Cl.
*H04L 5/00* (2006.01)
*H04L 1/00* (2006.01)
(Continued)

(52) U.S. Cl.
CPC .......... *H04L 5/0055* (2013.01); *H04L 1/0026* (2013.01); *H04L 1/0027* (2013.01);
(Continued)

(58) Field of Classification Search
CPC ... H04L 5/0055; H04L 1/0026; H04L 1/0027; H04L 1/1671; H04L 1/1854;
(Continued)

(56) References Cited

U.S. PATENT DOCUMENTS

| | | | |
|---|---|---|---|
| 8,942,080 B2 * | 1/2015 | Shen | H04L 1/1614 370/208 |
| 2009/0274100 A1 | 11/2009 | Montojo et al. | |

(Continued)

FOREIGN PATENT DOCUMENTS

| | | |
|---|---|---|
| CN | 101800620 A | 8/2010 |
| CN | 101984568 A | 3/2011 |

(Continued)

OTHER PUBLICATIONS

Office Action for corresponding Japanese Patent Application No. 2014-539218, 7 pp., (dated Aug. 4, 2015).
(Continued)

*Primary Examiner* — Hardikkumar D Patel
(74) *Attorney, Agent, or Firm* — Womble Bond Dickinson (US) LLP

(57) ABSTRACT

The embodiments of the present application relate to the technical field of wireless communications, and in particular, to a method, system and device for transmitting feedback information, used for realizing simultaneous feedback of multi-carrier ACK/NACK and periodical CSI. The method for sending feedback information in the embodiments of the present application includes: user equipment determining a PUCCH resource corresponding to first feedback information in second feedback information periodical reporting subframes; the user equipment determining feedback information to be transmitted and including the first feedback information according to the determined PUCCH resource and transmitting same via the PUCCH resource correspond- (Continued)

ing to the first feedback information. Since the user equipment determines feedback information including first feedback information according to the PUCCH resource corresponding to the first feedback information in the second feedback information periodical reporting subframes and transmits same via the determined PUCCH resource, thus realizing simultaneous feedback of multi-carrier ACK/NACK and periodical CSI.

16 Claims, 3 Drawing Sheets

(51) Int. Cl.
   *H04L 1/16* (2006.01)
   *H04L 1/18* (2006.01)
   *H04L 12/24* (2006.01)
   *H04L 29/06* (2006.01)

(52) U.S. Cl.
   CPC .......... *H04L 1/1671* (2013.01); *H04L 1/1854* (2013.01); *H04L 41/0853* (2013.01); *H04L 69/02* (2013.01)

(58) Field of Classification Search
   CPC ..... H04L 1/0853; H04L 69/02; H04L 1/1614; H04L 1/1621; H04L 1/1692; H04L 5/023; H04L 1/1812; H04L 1/0015; H04L 1/0029; H04L 1/003; H04L 1/1607; H04L 5/0053; H04L 5/0007; H04L 45/02; H04L 63/0209; H04L 45/42; H04L 47/11; H04L 63/20; H04L 67/327; H04L 63/107; H04L 12/569; H04L 63/10; H04L 45/38; H04L 63/0823; H04L 45/64; H04L 45/22; H04L 45/28; H04L 41/0668; H04L 45/00; H04L 63/02; H04L 49/15; H04L 12/28; H04L 45/12; H04L 45/123; H04L 45/124; H04L 47/10; H04L 47/29; H04L 47/31; H04L 47/39; H04L 65/4092; H04L 65/602; H04L 65/60; H04L 65/608; H04L 67/303; H04W 72/04; H04W 72/1289; H04W 72/042; H04W 28/065; H04W 84/047; H04W 28/04; H04W 72/00; H04W 12/06; H04J 11/00; H04J 3/00; H04J 14/0267; G06F 7/04; G06F 21/31; G06F 15/173
   See application file for complete search history.

(56) References Cited

U.S. PATENT DOCUMENTS

| | | | |
|---|---|---|---|
| 2010/0232373 A1* | 9/2010 | Nory ................. | H04W 72/1289 370/329 |
| 2010/0272019 A1 | 10/2010 | Papasakellariou | |
| 2012/0082145 A1* | 4/2012 | Chen ..................... | H04L 1/0029 370/338 |
| 2012/0099491 A1* | 4/2012 | Lee ....................... | H04L 1/0015 370/280 |
| 2012/0147773 A1* | 6/2012 | Kim ...................... | H04L 1/0025 370/252 |
| 2013/0223396 A1* | 8/2013 | Han ...................... | H04L 1/1671 370/329 |
| 2014/0192760 A1* | 7/2014 | Pajukoski ............. | H04L 5/0046 370/329 |

FOREIGN PATENT DOCUMENTS

| | | |
|---|---|---|
| CN | 101986591 A | 3/2011 |
| CN | 102045144 A | 5/2011 |
| CN | 102136896 A | 7/2011 |
| CN | 102347825 A | 2/2012 |
| KR | 10-2010-0014333 A | 2/2010 |
| WO | WO 2010/058979 A2 | 5/2010 |

OTHER PUBLICATIONS

CATT, "Enhancement for CSI Transmission in LTE-A Rel-11 with CA", 3GPP TSG RAN WG1 Meeting #66, R1-112104, Athens, Greece, 5 pp., (Aug. 22-26, 2011).
PCT Written Opinion of the International Searching Authority for counterpart PCT Application No. PCT/CN2012/079848, 22 pp. (including English translation), (dated Nov. 22, 2012).
PCT Notification concerning Transmittal of International Preliminary Report on Patentability (Chapter I of the Patent Cooperation Treaty) for counterpart PCT Application No. PCT/CN2012/079848, 25 pp. (including English translation), (dated May 15, 2014).
European Patent Office Communication enclosing Extended European Search Report for Counterpart European Patent Application No. 12846407.0, 9 pages, (dated Oct. 6, 2014).
ZTE, "Remaining Issues of UL Channel Combinations for Rel-10", 3GPP TSG RAN WG1 Meeting #64, R1-110808, Taipei, Taiwan, 6 pages, (Feb. 21-25, 2011).
CATR, "Consideration on UCI Transmission on PUCCH for LTE-A", 3GPP TSG RAN WG1 Meeting #62bis, R1-105645, Xi'an, China, 3 pages, (Oct. 11-15, 2010).
ZTE, "Multiplexing of Periodic CSI and ACK/NACK on PUCCH", 3GPP TSG RAN WG1 Meeting #63bis, R1-110164, Dublin, Ireland, 7 pages, (Jan. 17-21, 2011).
LG Electronics, "Simultaneous CSI+ACK/NACK Transmission on PUCCH Format 3", 3GPP TSG RAN WG1 #66, Athens, Greece, 2 pages, (Aug. 22-26, 2011).
ZTE, "Consideration on Uplink Signaling Enhancement in Rel-11 CA", 3GPP TSG RAN WG1 Meeting #66bis, R1-113006, Zhuhai, China, 6 pages, (Oct. 10-14, 2011).
Japanese Patent Office, "Office Action," for counterpart Japanese Patent Application No. 2014-539218, dated Nov. 21, 2017, 5 pgs., Japan.
ZTE, "Remaining Issues of UL Channel Combinations for Rel-10/" 3GPP TSG RAN WG1 Meeting #64, R1-110808, 6 pgs [retrieved online: http://www.3gpp.org/ftp/TSG_RAN/WG1_RL1/TSGR1_64/Docs/R1-110808.zip].
CATR, "Consideration on UCI Transmission on PUCCH for LTE-A," 3GPP TSG RAN WG1 Meeting #62bis, R1-105645, 3 pgs [retrieved online: http://www.3gpp.org/ftp/TSG_RAN/WG1_RL1/TSGR1_62b/Docs/R1-105645.zip].
3GPP, "3rd Generation Partnership Project; Technical Specification Group Radio Access Network; Evolved Universal Terrestrial Radio Access (E-UTRA); Physical layer procedures (Release 10)," TS 36.213 V.10.3.0 (Sep. 2011) 121 pgs [retrieved online: http://www.3gpp.org/ftp/Specs/archive/36_series/36.213/36213-a30.zip].
PCT International Search Report for PCT Counterpart Application No. PCT/CN2012/079648 with full English translation, 7 pgs. (dated Nov. 22, 2012).

* cited by examiner

METHOD, SYSTEM AND DEVICE FOR TRANSMITTING FEEDBACK INFORMATION

CROSS-REFERENCE TO RELATED APPLICATIONS

The present application is a U.S. National Stage of International Application No. PCT/CN2012/079848, filed Aug. 8, 2012, designating the United States, and claiming priority to the Chinese Patent Application No. 201110341818.6 filed with the Chinese Patent Office on Nov. 2, 2011, entitled "METHOD, SYSTEM AND DEVICE FOR TRANSMITTING FEEDBACK INFORMATION", which was incorporated by reference in its entirety.

FIELD OF THE INVENTION

The present invention relates to the technical field of wireless communications, and in particular to a method, system and device for transmitting feedback information.

BACKGROUND OF THE INVENTION

In the current Long Term Evolution (LTE) system, only one carrier, with the maximal bandwidth of 20 Mhz, is allowed in a cell, as shown in FIG. 1A.

For an LTE-Advanced (LTE-A) system, its peak rate has been greatly improved compared with that of the LTE system, and a downlink peak rate of 1 Gbps and an uplink peak rate of 500 Mbps are required in the LTE-A system. Apparently, a bandwidth of 20 Mhz fails to meet such a requirement. Carrier Aggregation (CA) technology is introduced for the purpose that the LTE-A system is capable of meeting the requirement, namely, a plurality of continuous or discontinuous carriers are aggregated together in the same cell, and when needed, serve the user equipment (UE) simultaneously to provide desired rates, therefore, the LTE-A system is a multi-carrier system. To ensure that the UE of the LTE-A system is capable of operating in each aggregated carrier, each carrier has a bandwidth of not more than 20 Mhz. The CA technology for the LTE-A system is shown in FIG. 1B.

In the LTE-A system in FIG. 1B, 4 carriers are aggregated. A base station may carry out data transmission on the 4 carriers simultaneously with the UE, to improve system throughput.

For a Frequency Division Duplex (FDD) system, a User Equipment (UE) receives downlink data in a sub-frame n−4, and feeds back, in an uplink sub-frame a signaling whether data in the downlink sub-frame needs to be retransmitted (i.e., Acknowledgement/Non-acknowledgement (ACK/NACK)). Upon carrier aggregation, ACK/NACK information corresponding to a plurality of downlink carriers in the sub-frame n−4 is fed back in the uplink sub-frame n simultaneously.

For a Time Division Duplex (TDD) system, UE may feed back ACK/NACK information corresponding to a plurality of downlink sub-frames in one uplink sub-frame, i.e., after demodulating and decoding data in the downlink sub-frame n−k, the UE feeds back, on the uplink sub-frame n, to the base station signaling (i.e. ACK/NACK) whether the data in the downlink sub-frame needs to be retransmitted, where k∈K, and the value of the set K is related to uplink/downlink configurations of the system and specific sub-frame serial numbers, specially shown in Table 1.

TABLE 1

| Uplink and Downlink Configuration | Provision on Uplink Feedback for Downlink Transmission | | | | | | | | |
|---|---|---|---|---|---|---|---|---|---|
| | Sub-Frame Serial Numbers | | | | | | | | |
| Structures | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 6, 4 | — | — | — | — | 8, 7, 6, 4 | — | — |
| 3 | — | — | 11, 7, 6 | 6, 5 | 5, 4 | — | — | — | — | — |
| 4 | — | — | 12, 11, 8, 7 | 7, 6, 5, 4 | — | — | — | — | — | — |
| 5 | — | — | 13, 12, 11, 9, 8, 7, 6, 5, 4 | — | — | — | — | — | — | — |
| 6 | — | — | 7 | 7 | 5 | — | — | 7 | 7 | — |

A plurality of radio frames are sequentially arranged, i.e., if the last sub-frame in the radio frame a is sub-frame k, then the first sub-frame in the radio frame a+1 is sub-frame k+1. Only the example of one radio frame is given in Table 1 to show the conditions of K corresponding to each uplink sub-frame, wherein if n−k<0, then this represents the downlink sub-frame in the previous radio frame.

In the LTE system, the UE needs to feed Channel State Information (CSI) back to the base station. The base station performs downlink dynamic scheduling by using the CSI fed back by the UE.

Based on different trigger mechanisms, CSI is classified into two types: periodic CSI and non-periodic CSI. The reporting period of the periodic CSI and the shift in the period are semi-statically configured by the base station via Radio Resource Control (RRC) signaling, and the UE transmits the CSI in a particular uplink sub-frame according to configuration information. In a sub-frame without uplink data transmission, the periodic CSI is transmitted by using a Physical Uplink Control Channel (PUCCH), and the PUCCH resource for transmitting the periodic CSI is semi-statically configured by the base station.

In an LTE-A Release-10 (Rel-10) carrier aggregation system, the parameters of the periodic CSI of different component carriers are configured independently, the UE only feeds back the periodic CSI of one component carrier in each reporting sub-frame, and if there are collisions of the periodic CSI of a plurality of component carriers, the periodic CSI with the highest priority is fed back in accordance with the predetermined priorities.

The non-periodic CSI is triggered by the base station via downlink scheduling signaling, the UE reports CSI only after receiving trigger signaling, and the non-periodic CSI is transmitted by using a Physical Uplink Shared Channel (PUSCH). UE may report the non-periodic CSI of a plurality of component carriers simultaneously in accordance with the trigger condition of the base station.

In an LTE-A Rel-11 system, simultaneous feedback of multi-carrier ACK/NACK information and periodic CSI will be supported in order to improve the downlink transmission efficiency of the system and reduce the loss probability of the periodic CSI, however, the scheme for simultaneous feedback of multi-carrier ACK/NACK and periodic CSI has not been found yet at present.

SUMMARY OF THE INVENTION

Provided in the embodiments of the present invention is a method, system and device for transmitting feedback information, to realize simultaneous feedback of multi-carrier ACK/NACK and periodic CSI.

Provided in an embodiment of the present invention is a method for sending feedback information, including:

determining, by a user equipment, a PUCCH resource corresponding to first feedback information in a second feedback information periodic reporting sub-frame; and determining, by the user equipment, feedback information including the first feedback information to be transmitted according to the determined PUCCH resource, and transmitting the feedback information via the PUCCH resource corresponding to the first feedback information.

Provided in an embodiment of the present invention is a method for receiving feedback information, including:

determining, by a network side device, a type of feedback information to be transmitted by a user equipment according to a PUCCH resource corresponding to first feedback information in a second feedback information periodic reporting sub-frame; and receiving, by the network side device, the feedback information transmitted by the user equipment according to the determined type of the feedback information on the PUCCH resource.

Provided in an embodiment of the present invention is a user equipment for sending feedback information, including:

a first determining component, configured to determine a PUCCH resource corresponding to first feedback information in a second feedback information periodic reporting sub-frame; and a transmitting component, configured to determine feedback information including the first feedback information to be transmitted according to the determined PUCCH resource, and transmit the feedback information via the PUCCH resource corresponding to the first feedback information.

Provided in an embodiment of the present invention is a network side device for receiving feedback information, including:

a second determining component, configured to determine a type of feedback information to be transmitted by a user equipment according to a PUCCH resource corresponding to first feedback information in a second feedback information periodic reporting sub-frame; and a receiving component, configured to receive the feedback information transmitted by the user equipment according to the determined type of the feedback information on the PUCCH resource.

Provided in an embodiment of the present invention is a system for transmitting feedback information, including:

a user equipment, configured to determine a PUCCH resource corresponding to first feedback information in a second feedback information periodic reporting sub-frame, determine feedback information including the first feedback information to be transmitted according to the determined PUCCH resource, and transmit the feedback information via the PUCCH resource corresponding to the first feedback information, wherein the feedback information includes the first feedback information; and a network side device, configured to determine a type of the feedback information to be transmitted by the user equipment according to the PUCCH resource corresponding to the first feedback information in the second feedback information periodic reporting sub-frame, and receive the feedback information transmitted by the user equipment according to the determined type of the feedback information on the PUCCH resource.

The user equipment determines the feedback information including the first feedback information according to the PUCCH resource corresponding to the first feedback information in the second feedback information periodic reporting sub-frame and transmits the feedback information via the determined PUCCH resource, thus realizing simultaneous feedback of multi-carrier ACK/NACK and periodic CSI; and further on the premise that the efficiency of ACK/NACK in the joint-feedback process is ensured effectively, the number of times of discarding CSI is reduced and the downlink transmission performance of the system is improved.

DETAILED DESCRIPTION OF THE EMBODIMENTS

Given the fact that the scheme for simultaneous feedback of multi-carrier ACK/NACK and periodic CSI has not been found yet in the prior art, in the embodiment of the present invention, a user equipment determines feedback information including first feedback information according to a PUCCH resource corresponding to the first feedback information in a second feedback information periodic reporting sub-frame, and transmits the feedback information via the determined PUCCH resource, thus realizing simultaneous feedback of multi-carrier ACK/NACK and periodic CSI.

In an implementation, the first feedback information in the embodiment of the present invention may be feedback information for downlink carriers, i.e., ACK/NACK information; and the second feedback information may be CSI.

It shall be noted that, the first feedback information and the second feedback information in the embodiment of the present invention are not limited to the aforementioned ACK/NACK information and CSI, other feedback information that needs to be transmitted via a reporting sub-frame for transmitting another feedback information may also be the first feedback information in the embodiment of the present invention, and other feedback information with the characteristic of periodic reporting may also be the second feedback information in the embodiment of the present invention.

The embodiments of the present invention will be further illustrated below in details in conjunction with the accompanying drawings of the description.

In the description hereinafter, description is made from cooperation of the network side and the user equipment side at first, and then description is made from implementations of the network side and the user equipment side, respectively, however, this does not mean that the both must cooperate; in fact, when the network side and the user equipment side implement separately, the problems that exist at the network side and the user equipment side are solved respectively, but combined use of the both can result in better technical effects.

Figure 1A:
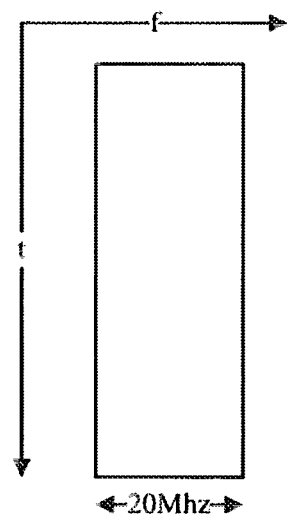
FIG. 1A is a schematic diagram of a single-spectrum system in the prior art.
Figure 1B:
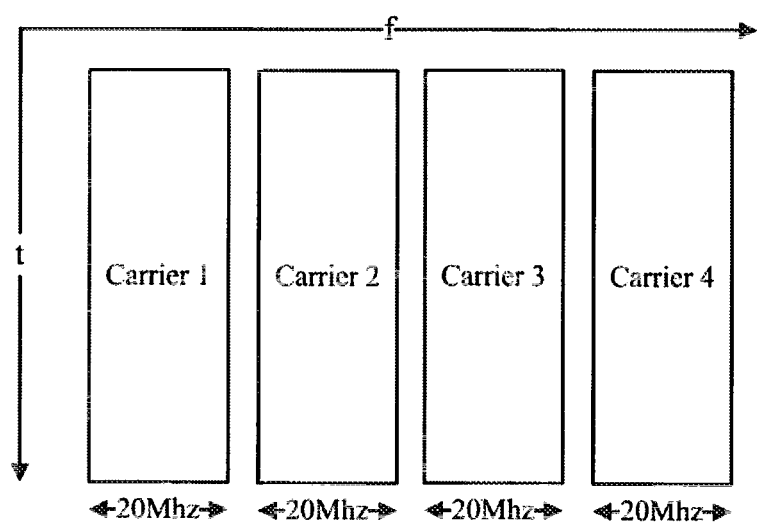
FIG. 1B is a schematic diagram of a spectrum aggregation system in the prior art.
Figure 2:
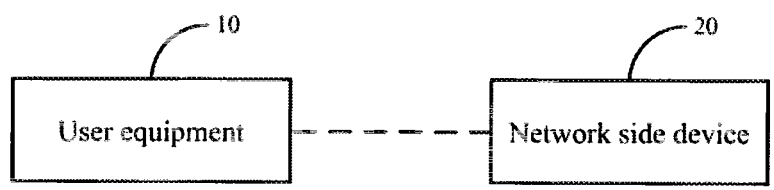
FIG. 2 is a structural diagram of a system for transmitting feedback information in an embodiment of the present invention.

As shown in FIG. 2, the system for transmitting feedback information in the embodiment of the present invention includes a user equipment 10 and a network side device 20.

The user equipment 10 is configured to determine a PUCCH resource corresponding to first feedback information in a second feedback information periodic reporting sub-frame, determine feedback information including the first feedback information to be transmitted (the first feedback information herein represents a piece of feedback information including specific contents, e.g., ACK/NACK information and specific contents) according to the determined PUCCH resource, and transmit the feedback information via the PUCCH resource corresponding to the first feedback information.

The network side device 20 is configured to determine a type of the feedback information to be transmitted by the user equipment 10 according to the PUCCH resource corresponding to the first feedback information in the second feedback information periodic reporting sub-frame, and receive the feedback information transmitted by the user equipment according to the determined type of the feedback information on the PUCCH resource.

Preferably, the network side device 20 determines that the type of the feedback information to be transmitted by the user equipment 10 includes the first feedback information (the first feedback information herein represents one type of feedback information. e.g., ACK/NACK information).

Preferably, the user equipment 10 determines the PUCCH resource corresponding to the first feedback information according to a configured transmission mode of the first feedback information by the network side and received downlink data; correspondingly, the network side device 20 determines the PUCCH resource corresponding to the first feedback information according to the configured transmission mode of the first feedback information for the user equipment 10 and the downlink data transmitted to the user equipment 10.

Specifically, for the FDD system, if the user equipment 10 is configured to transmit the first feedback information using PUCCH format 3 and the user equipment 10 only receives a downlink dynamic schedule-Physical Downlink Control Channel (PDCCH) or a downlink Semi-Persistent Schedule-Physical Downlink Shared Channel (SPS-PDSCH) on a main carrier, then the PUCCH resource corresponding to the first feedback information is a resource corresponding to PUCCH format 1a or PUCCH format 1b; otherwise, the PUCCH resource corresponding to the first feedback information is a resource corresponding to the PUCCH format 3.

For the FDD system, if the user equipment 10 is configured to transmit the first feedback information using the PUCCH format 1a or the PUCCH format 1b or using the mode of PUCCH format 1b with channel selection, then the PUCCH resource corresponding to the first feedback information is a resource corresponding to the PUCCH format 1a or the PUCCH format 1b.

For the TDD system, if the user equipment 10 is configured to transmit the first feedback information using the PUCCH format 3, and the user equipment 10 only receives a downlink dynamic schedule-PDCCH with the value of downlink assignment index (DAI) information field therein being 1 and/or an SPS-PDSCH on the main carrier, then the PUCCH resource corresponding to the first feedback information is a resource corresponding to the PUCCH format 1a or the PUCCH format 1b; otherwise, the PUCCH resource corresponding to the first feedback information is a resource corresponding to the PUCCH format 3.

For the TDD system, if the user equipment 10 is configured to transmit the first feedback information using an ACK/NACK combining mode, ACK/NACK multiplexing mode or the mode of PUCCH format 1b with channel selection, then the PUCCH resource corresponding to the first feedback information is a resource corresponding to the PUCCH format 1a or the PUCCH format 1b.

In an implementation, the user equipment 10 may determine whether the first feedback information and the second feedback information are transmitted simultaneously; if not, then only the first feedback information is transmitted, i.e., the feedback information to be transmitted is determined as the first feedback information according to the determined PUCCH resource.

Correspondingly, the network side device 20 may determine whether the user equipment 10 transmits the first feedback information and the second feedback information simultaneously; if not, the network side device 20 determines that the user equipment 10 only transmits the first feedback information.

Preferably, if the PUCCH resource corresponding to the first feedback information is a resource used by a large-capacity PUCCH, wherein the large-capacity PUCCH includes: PUCCH format 2, PUCCH format 3 or PUCCH format with a bearing capacity not less than that of the PUCCH format 3, then the user equipment 10 determines the first feedback information to be transmitted and the second feedback information to be transmitted.

Correspondingly, if the PUCCH resource corresponding to the first feedback information is the resource used by the large-capacity PUCCH, then the network side device 20 determines that the first feedback information is included in the type of the feedback information to be transmitted by the user equipment 10.

That is to say, if the PUCCH resource corresponding to the first feedback information is the resource used by the large-capacity PUCCH, then it can be determined that the user equipment 10 definitely transmits the first feedback information, and whether the second feedback information is transmitted simultaneously needs to be judged further; if the second feedback information is determined to be not transmitted, then the feedback information to be transmitted is determined as the first feedback information according to the determined PUCCH resource; if the second feedback information is determined to be transmitted, then the feedback information to be transmitted is determined as the first feedback information and the second feedback information according to the determined PUCCH resource, and the specific contents for judgment are shown in the description hereinafter.

Preferably, if the PUCCH resource corresponding to the first feedback information is a resource used by a small-capacity PUCCH or the first feedback information is transmitted using the mode of PUCCH format 1b with channel selection, wherein the small-capacity PUCCH includes: PUCCH format 1a or PUCCH format 1b, then the user equipment 10 determines the first feedback information to be transmitted only, and discards the second feedback information.

Correspondingly, if the PUCCH resource corresponding to the first feedback information is the resource used by the small-capacity PUCCH or the first feedback information is transmitted using the mode of PUCCH format 1b with channel selection, then the network side device 20 determines that only the first feedback information is included in the type of the feedback information to be transmitted by the user equipment 10.

That is to say, if the PUCCH resource corresponding to the first feedback information is the resource used by the small-capacity PUCCH or the first feedback information is transmitted using the mode of PUCCH format 1b with channel selection, then it can be determined that the user equipment 10 transmits the first feedback information only, and does not transmit the second feedback information.

Preferably, for facilitating resource allocation at the network side, a configuration function may be added. Specifically, the network side device 20 may configure, as required at first, whether the user equipment 10 can transmit the first feedback information and the second feedback information simultaneously; correspondingly, the user equipment 10, according to the configuration at the network side, further judges whether the first feedback information and the second feedback information are transmitted simultaneously when determining that the first feedback information and the second feedback information can be transmitted simultaneously, and if the user equipment determines that the first feedback information and the second feedback information cannot be transmitted simultaneously according to the configuration at the network side, then there is no need of any judgment and only the first feedback information needs to be transmitted.

Preferably, the user equipment 10 may preprocess the first feedback information after determining that the first feedback information and the second feedback information are transmitted simultaneously; correspondingly, the network side device 20 determines that the user equipment 10 preprocesses the first feedback information, when determining that the user equipment 10 needs to transmit the first feedback information and the second feedback information simultaneously.

The preprocessing includes, but not limited to at least one of compressing processing and encoding processing.

Compressing processing: the first feedback information is combined to reduce the bit number of the feedback information to be transmitted.

Encoding processing: the first feedback information is channel-encoded to improve the reliability in transmitting the first feedback information.

Preferably, the user equipment 10 determines that the first feedback information needs to be preprocessed according to configuration at network side or protocol provisions. Specifically, whether the first feedback information is preprocessed may be configured by the network side device 20, or predefined by the system. If a plurality of preprocessing methods are supported by the system, then the network side device 20 may further instruct the preprocessing methods to be used via signaling, and several instruction modes are listed below:

1: The network side device 20 instructs, via signaling, whether the first feedback information is compressed. If the instruction is "yes", then ACK/NACK is compressed according to the predefined method; and if the instruction is "no", then ACK/NACK is not compressed.

2: The network side device 20 notifies, via signaling, the use equipment 10 of the maximal bit number M of the first feedback information which can be transmitted. If the bit number of the first feedback information which is practically fed back ≤M, then compressing processing is unnecessary; and if the bit number of the first feedback information which is practically fed back >M, then compressing is carried out according to the predefined method.

3: If these two preprocessing modes (compressing and encoding) are supported by the system, then ACK/NACK is compressed according to the predefined method when the network side device 20 instructs "compressing" via signaling; and ACK/NACK is encoded according to the predefined method when the network side device 20 instructs "encoding" via signaling.

Preferably, if the user equipment 10 only transmits the first feedback information (including that only the first feedback information is determined to be transmitted since the PUCCH resource corresponding to the first feedback information is the resource used by the small-capacity PUCCH or the first feedback information is transmitted using the mode of PUCCH format 1b with channel selection; and further including that the PUCCH resource corresponding to the first feedback information is the resource used by the large-capacity PUCCH, but only the first feedback information is determined to be transmitted according to further judgment), then the user equipment 10 does not need to preprocess the first feedback information and only needs to transmit the non-preprocessed first feedback information, and the network side device 20 determines that the user equipment transmits the non-preprocessed first feedback information. That is to say, the transmission method in this case is the same as that when the first feedback information is transmitted independently.

In an implementation, in the case that the PUCCH resource corresponding to the first feedback information is the resource used by the large-capacity PUCCH, several modes of judging whether the second feedback information and the first feedback information are transmitted simultaneously are listed below.

The first judgment mode: comparison between transmitted bit number and a threshold.

Specifically, the sum of the bit number of the second feedback information and the bit number of the preprocessed first feedback information is not more than a threshold, the user equipment 10 transmits the second feedback information and the preprocessed first feedback information simultaneously (correspondingly, the network side device 20 determines that the user equipment 10 transmits the second feedback information and the preprocessed first feedback information simultaneously).

If the sum of the bit number of the second feedback information and the bit number of the preprocessed first feedback information is more than the threshold, the user equipment 10 transmits the first feedback information only, or a part of the second feedback information and the preprocessed first feedback information, wherein the sum of the bit number of the part of the second feedback information and the bit number of the preprocessed first feedback information is not more than the threshold (correspondingly, the network side device 20 determines that the user equipment 10 transmits the first feedback information only, or a part of the second feedback information and the preprocessed first feedback information).

The threshold is determined by configuration at the network side or protocol provisions.

Preferably, the user equipment 10 and the network side device 20 select the part of the second feedback information according to information priority.

Specifically, the user equipment 10 and the network side device 20 select information with high priority from the second feedback information to be transmitted according to the predefined priority order and transmit the selected information and the preprocessed first feedback information simultaneously, and the sum of the bit number of the selected second feedback information and the bit number of the preprocessed first feedback information is not more than the threshold.

Figure 3:
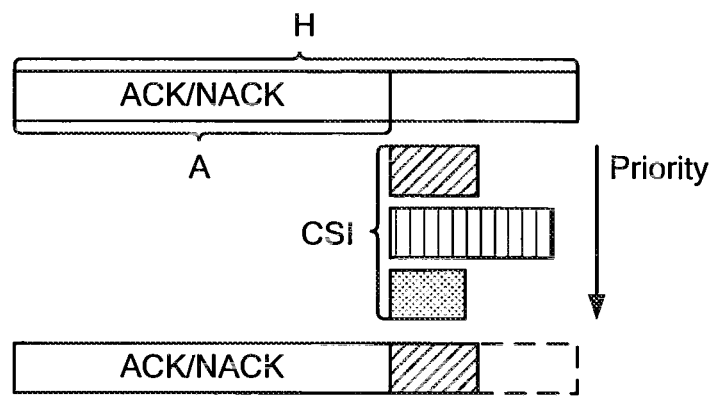
FIG. 3 is a schematic diagram of a first priority-based selection in an embodiment of the present invention.

For example, only the priority order may be taken into consideration. As shown in FIG. 3, the second feedback information is divided into three parts based on the priorities, the part with the highest priority has a length of S1, the part with the second priority has a length of S2, and the part with the lowest priority has a length of S3. If A+S1<H but A+S1+S2>H, then only the CSI with the first priority and the preprocessed ACK/NACK information are transmitted simultaneously. In the method, if S1+A>H, then the second feedback information is not transmitted, and the UE only transmits the ACK/NACK information.

Figure 4:
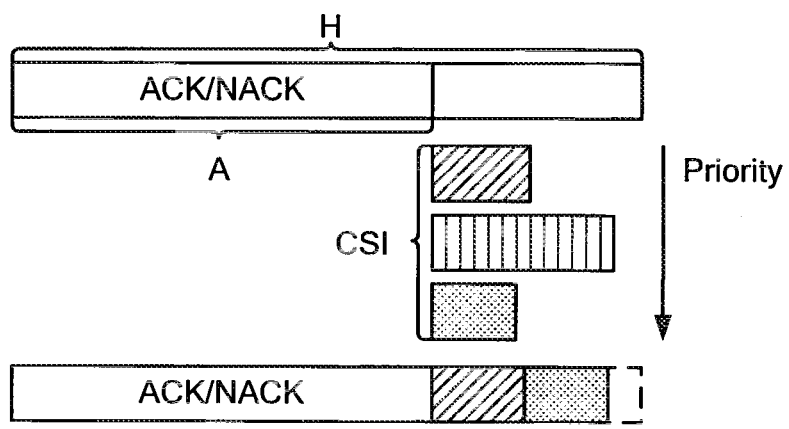
FIG. 4 is a schematic diagram of a second priority-based selection in an embodiment of the present invention.

For example, the priority order and the sizes of the various parts of the second feedback information may be taken into consideration. As shown in FIG. 4, if A+S1<H and A+S1+S2>H, but A+S1+S3<H after a further comparison, then the CSI with the first and third priorities and the preprocessed ACK/HACK information are transmitted simultaneously.

The second judgment mode: comparison between transmitted bit numbers.

Specifically, if the bit number of the second feedback information to be transmitted is not more than the bit number of the second feedback information which can be transmitted, the user equipment 10 transmits the second feedback information and the preprocessed first feedback information simultaneously (correspondingly, the network side device 20 determines that the user equipment 10 transmits the second feedback information and the preprocessed first feedback information simultaneously).

If the bit number of the second feedback information to be transmitted is more than the bit number of the second Feedback information which can be transmitted, the user equipment 10 transmits the first feedback information only, or a part of the second feedback information and the preprocessed first feedback information, wherein the bit number of the part of the second feedback information is not more than the bit number of the second feedback information which can be transmitted (correspondingly, the network side device 20 determines that the user equipment 10 transmits the first feedback information only, or a part of the second feedback information and the preprocessed first feedback information).

Preferably, the user equipment 10 and the network side device 20 determine the bit number of the second feedback information which can be transmitted according to the step below:

Determining the bit number of the second feedback information which can be transmitted according to configuration at the network side or protocol provisions; or Taking an encoding bit number for transmitting, the second feedback information in the PUCCH as the bit number of the second feedback information which can be transmitted; or Taking the product of the encoding bit number for transmitting the second feedback information in the PUCCH and a target code rate of the second feedback information as the bit number of the second feedback information which can be transmitted, wherein the target code rate of the second feedback information is determined by configuration at the network side or protocol provisions. For example, the maximal number of the CSI transmitted in the PUCCH is L, L=Y or L=$r_{CSI}$Y, and the target code rate $r_{CSI}$ of the CSI is configured by the base station, wherein Y is the encoding bit number for transmitting the CSI in the PUCCH.

Preferably, for the aforementioned encoding bit number for transmitting the second feedback information in the PUCCH, the user equipment 10 and the network side device 20 determine the encoding bit number for transmitting the second feedback information in the PUCCH according to the step below:

Taking the difference of a total encoding bit number for transmitting information in the PUCCH and an encoding bit number for transmitting the first feedback information in the PUCCH as the encoding bit number for transmitting the second feedback information in the PUCCH.

For example, Y=Z−X, wherein X is the encoding bit number for transmitting the ACK/NACK information in the PUCCH, X may be configured by the base station, or determined according to the bit number of the preprocessed ACK/NACK information; and Z is the maximal encoding bit number the PUCCH is capable of bearing, and Z may be configured by the base station via signaling, or predefined by the system.

Preferably, for the aforementioned encoding bit number for transmitting the first feedback information in the PUCCH, the user equipment 10 and the network side device 20 determine the encoding bit number for transmitting the first feedback information in the PUCCH according to the step below:

Determining the encoding bit number for transmitting the first feedback information in the PUCCH according to configuration at the network side or protocol provisions; or Dividing the bit number of the preprocessed first feedback information by the target code rate of the first feedback information and flooring the quotient, and taking the resulted value as the encoding bit number for transmitting the first feedback information in the PUCCH, wherein the target code rate of the first feedback information is determined by configuration at the network side or protocol provisions. For example, X=$\lfloor A/r_{HARQ} \rfloor$, the base station notifies the UE of $r_{HARQ}$ corresponding to ACK/NACK transmission, X is the encoding bit number for transmitting the first feedback information in the PUCCH, and A is the bit number of the preprocessed first feedback information.

Preferably, the user equipment 10 and the network side device 20 select the part of the second feedback information according to information priority.)

Specifically, the user equipment 10 and the network side device 20 select information with high priority from the second feedback information to be transmitted according to the predefined priority order and transmit the selected information and the preprocessed first feedback information simultaneously, and the bit number of the selected second feedback information is not more than the bit number of the second feedback information which can be transmitted. The specific selection mode is similar to that in the first judgment mode and is omitted herein.

No matter which of the aforementioned judgment modes is employed, the user equipment 10, after determining that the second feedback information and the preprocessed first feedback information are transmitted simultaneously, may separately encode and then transmit the second feedback information and the preprocessed first feedback information; correspondingly, the network side device 20 independently decodes the second feedback information and the preprocessed first feedback information; or The user equipment 10 jointly encodes and then transmits the second feedback information and the preprocessed first feedback information; correspondingly; the network side device 20 jointly decodes the second feedback information and the preprocessed first feedback information.

The network side device in the embodiment of the present invention may be a base station (e.g. macro base station, home base station, etc.), may also be RN (Relay Node) device, and may also be other network side devices.

On the basis of the same inventive concept, further provided in the embodiments of the present invention are a network side device, a user equipment, a method for sending feedback information, and a method for receiving feedback information. The principle of the devices and methods in solving problems is the same as that of the system for transmitting feedback information in the embodiment of the present invention, therefore, for implementations of the devices and methods, reference may be made to the implementation of the system, and the repeated parts are omitted herein.

Figure 5:
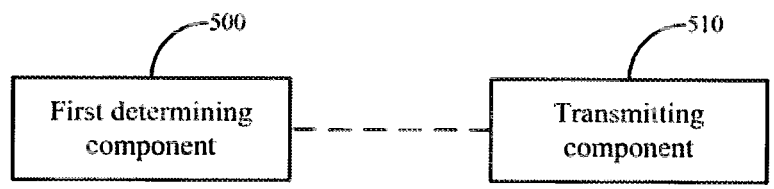
FIG. 5 is a structural diagram of a user equipment in an embodiment of the present invention.

As shown in FIG. 5, a user equipment in the embodiment of the present invention includes a first determining component 500 and a transmitting component 510.

The first determining component 500 is configured to determine a PUCCH resource corresponding to first feedback information in a second feedback information periodic reporting sub-frame.

The transmitting component 510 is configured to determine feedback information including the first feedback information to be transmitted according to the determined PUCCH resource, and transmit the feedback information via the PUCCH resource corresponding to the first feedback information.

Preferably, the first determining component 500 determines the PUCCH resource corresponding to the first feedback information according to a configured transmission mode of the first feedback information by the network side and received downlink data.

Preferably, the transmitting component 510 is further configured to determine first feedback information to be transmitted and second feedback information to be transmitted if the PUCCH resource corresponding to the first feedback information is a resource used by a large-capacity PUCCH;

wherein the large-capacity PUCCH includes: PUCCH format 2, PUCCH format 3 or PUCCH format with a bearing capacity not less than that of the PUCCH format 3.

Preferably, the transmitting component 510 is further configured to determine the first feedback information to be transmitted if the PUCCH resource corresponding to the first feedback information is a resource used by a small-capacity PUCCH or the first feedback information is transmitted using the mode of PUCCH format 1b with channel selection;

wherein the small-capacity PUCCH includes: PUCCH format 1a or PUCCH format 1b.

Preferably, the transmitting component 510, before determining the first feedback information to be transmitted and the second feedback information to be transmitted, determines that the first feedback information and the second feedback information can be transmitted simultaneously according to configuration at the network side.

Preferably, the transmitting component 510 preprocesses the first feedback information before the first feedback information and the second feedback information are transmitted simultaneously.

Preferably, the transmitting component 510 determines that the first feedback information needs to be preprocessed according to configuration at the network side or protocol provisions.

Preferably, the transmitting component 510 is further configured to:

transmit the second feedback information and the preprocessed first feedback information simultaneously if the sum of the bit number of the second feedback information and the bit number of the preprocessed first feedback information is not more than a threshold; or transmit the first feedback information only, or a part of the second feedback information and the preprocessed first feedback information if the sum of the bit number of the second feedback information and the bit number of the preprocessed first feedback information is more than the threshold, wherein the sum of the bit number of the part of the second feedback information and the bit number of the preprocessed first feedback information is not more than the threshold;

wherein the threshold is determined by configuration at the network side or protocol provisions.

Preferably, the transmitting component 510 is further configured to:

transmit the second feedback information and the preprocessed first feedback information simultaneously if the bit number of the second feedback information to be transmitted is not more than the bit number of the second feedback information which can be transmitted; or transmit the first feedback information only, or a part of the second feedback information and the preprocessed first feedback information if the bit number of the second feedback information to be transmitted is more than the bit number of the second feedback information which can be transmitted, wherein the bit number of the part of the second feedback information is not more than the bit number of the second feedback information which can be transmitted.

Preferably, the transmitting component 510 determines the bit number of the second feedback information which can be transmitted according to the step below:

Determining the bit number of the second feedback information which can be transmitted according to configuration at the network side or protocol provisions; or Taking an encoding bit number for transmitting the second feedback information in the PUCCH as the bit number of the second feedback information which can be transmitted; or Taking the product of the encoding bit number for transmitting the second feedback information in the PUCCH and a target code rate of the second feedback information as the bit number of the second feedback information which can be transmitted, wherein the target code a rate of the second feedback information is determined by configuration at the network side or protocol provisions.

Preferably, the transmitting component 510 determines the encoding bit number for transmitting the second feedback information in the PUCCH according to the step below:

Taking the difference of a total encoding bit number for transmitting information in the PUCCH and an encoding bit number for transmitting the first feedback information in the PUCCH as the encoding bit number for transmitting the second feedback information in the PUCCH.

Preferably, the transmitting component 510 determines the encoding bit number for transmitting the first feedback information in the PUCCH according to the step below:

Determining the encoding bit number for transmitting the first feedback information in the PUCCH according to configuration at the network side or protocol provisions; or Dividing the bit number of the preprocessed first feedback information by the target code rate of the first feedback information and flooring the quotient, and taking the resulted value as the encoding bit number for transmitting the first feedback information in the PUCCH, wherein the target code rate of the first feedback information is determined by configuration at the network side or protocol provisions.

Preferably, the transmitting component 510 selects the part of the second feedback information to be transmitted according to the step below:

Selecting the part of the second feedback information according to information priority.

Preferably, the transmitting component 510 separately encodes and then transmits the second feedback information and the preprocessed first feedback information, or jointly encodes and then transmits the second feedback information and the preprocessed first feedback information.

Preferably, the transmitting component 510 transmits the non-preprocessed first feedback information when transmitting the first feedback information only.

Figure 6:
FIG. 6 is a structural diagram of a network side device in an embodiment of the present invention.

As shown in FIG. 6, a network side device in the embodiment of the present invention includes a second determining component 600 and a receiving component 610.

The second determining component 600 is configured to determine a type of feedback information to be transmitted by a user equipment according to a PUCCH resource corresponding to first feedback information in a second feedback information periodic reporting sub-frame.

The receiving component 610 is configured to receive the feedback information transmitted by the user equipment according to the determined type of the feedback information on the PUCCH resource.

Preferably, the second determining component 600 determines the PUCCH resource corresponding to the first feedback information according to a configured transmission mode of the first feedback information for the user equipment and downlink data transmitted to the user equipment.

Preferably, the second determining component 600 is further configured to:

determine that the first feedback information is included in the type of the feedback information to be transmitted by the user equipment if the PUCCH resource corresponding to the first feedback information is a resource used by a large-capacity PUCCH;

wherein the large-capacity PUCCH includes: PUCCH format 2, PUCCH format 3 or PUCCH format with a bearing capacity not less than that of the PUCCH format 3.

Preferably, the second determining component 600 is further configured to:

determine that only the first feedback information is included in the type of the feedback information to be transmitted by the user equipment if the PUCCH resource corresponding to the first feedback information is a resource used by a small-capacity PUCCH or the first feedback information is transmitted using the mode of PUCCH format 1b with channel selection;

wherein the small-capacity PUCCH includes: PUCCH format 1a or PUCCH format 1b.

Preferably, the second determining, component 600 configures that the first feedback information and the second feedback information can be transmitted by the user equipment simultaneously.

Preferably, the second determining component 600 determines that the first feedback information is preprocessed by the user equipment, when determining that the first feedback information and the second feedback information need to be transmitted by the user equipment simultaneously.

Preferably, the second determining component 600 is further configured to:

determine that the second feedback information and the preprocessed first feedback information are transmitted by the user equipment simultaneously if the sum of the bit number of the second feedback information and the bit number of the preprocessed first feedback information is not more than a threshold; or determine that the user equipment only transmits the first feedback information, or transmits a part of the second feedback information and the preprocessed first feedback information if the sum of the bit number of the second feedback information and the bit number of the preprocessed first feedback information is more than the threshold, wherein the sum of the bit number of the part of the second feedback information and the bit number of the preprocessed first feedback information is not more than the threshold, wherein the threshold is determined by configuration at the network side or protocol provisions.

Preferably, the second determining component 600 is further configured to:

determine that the second feedback information and the preprocessed first feedback information are transmitted by the user equipment simultaneously if the bit number of the second feedback information to be transmitted is not more than the bit number of the second feedback information which can be transmitted: or determine that the user equipment only transmits the first feedback information, or transmits a part of the second feedback information and the preprocessed first feedback information if the bit number of the second feedback information to be transmitted is more than the bit number of the second feedback information which can be transmitted, wherein the bit number of the part of the second feedback information is not more than the bit number of the second feedback information which can be transmitted.

Preferably, the second determining component 600 determines the bit number of the second feedback information which can be transmitted according to the step below:

Determining the bit number of the second feedback information which can be transmitted according to configuration at the network side or protocol provisions; or Taking an encoding bit number for transmitting the second feedback information in the PUCCH as the bit number of the second feedback information which can be transmitted: or Taking the product of the encoding bit number for transmitting the second feedback information in the PUCCH and a target code rate of the second feedback information as the bit number of the second feedback information which can be transmitted, wherein the target code rate of the second feedback information is determined by configuration at the network side or protocol provisions.

Preferably, the second determining component 600 determines the encoding bit number for transmitting the second feedback information in the PUCCH according to the step below:

Taking the difference of a total encoding bit number for transmitting information in the PUCCH and an encoding bit number for transmitting the first feedback information in the PUCCH as the encoding bit number for transmitting the second feedback information in the PUCCH.

Preferably, the second determining component 600 determines the encoding bit number for transmitting the first feedback information in the PUCCH according to the step below:

Determining the encoding bit number for transmitting the first feedback information in the PUCCH according to configuration at the network side or protocol provisions; or Dividing the bit number of the preprocessed first feedback information by the target code rate of the first feedback information and flooring the quotient, and taking the resulted value as the encoding bit number for transmitting the first feedback information in the PUCCH, wherein the target code rate of the first feedback information is determined by configuration at the network side or protocol provisions.

Preferably, the second determining component 600 selects the part of the second feedback information to be transmitted according to the step below: selecting the part of the second feedback information according to information priority.

Preferably, the second determining component 600, when determining that the user equipment transmits the first feedback information only, determines that the user equipment transmits the non-preprocessed first feedback information.

Figure 7:
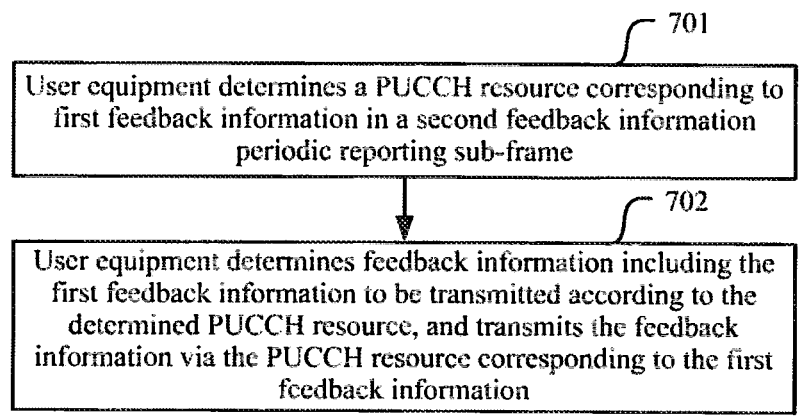
FIG. 7 is a flow chart of a method for sending feedback information in an embodiment of the present invention.

As shown in FIG. 7, a method for sending feedback information in an embodiment of the present invention includes the following steps.

Step 701, a user equipment determines a PUCCH resource corresponding to first feedback information in a second feedback information periodic reporting sub-frame.

Step 702, the user equipment determines feedback information including the first feedback information to be transmitted according to the determined PUCCH resource, and transmits the feedback information via the PUCCH resource corresponding to the first feedback information.

Preferably, in step 701, the user equipment determines the PUCCH resource corresponding to the first feedback information according to a configured transmission mode of the first feedback information by the network side and received downlink data.

Preferably, in step 702, the user equipment determines first feedback information to be transmitted and second feedback information to be transmitted if the PUCCH resource corresponding to the first feedback information is a resource used by a large-capacity PUCCH;

wherein the large-capacity PUCCH includes: PUCCH format 2, PUCCH format 3 or PUCCH format with a bearing capacity not less than that of the PUCCH format 3, Preferably, in step 702, the user equipment determines the first feedback information to be transmitted if the PUCCH resource corresponding to the first feedback information is a resource used by a small-capacity PUCCH or the first feedback information is transmitted using the mode of PUCCH format 1b with channel selection;

wherein the small-capacity PUCCH includes: PUCCH format 1a or PUCCH format 1b.

Preferably, in step 702, the user equipment, before determining the first feedback information to be transmitted and the second feedback information to be transmitted, determines that the first feedback information and the second feedback information can be transmitted simultaneously according to configuration at the network side.

Preferably, in step 702, the user equipment preprocesses the first feedback information before transmitting the first feedback information and the second feedback information simultaneously.

Preferably, in step 702, the user equipment, before preprocessing the first feedback information, determines that the first feedback information needs to be preprocessed according to configuration at the network side or protocol provisions.

Preferably, in step 702, if the sum of the bit number of the second feedback information and the bit number of the preprocessed first feedback information is not more than a threshold, the user equipment transmits the second feedback information and the preprocessed first feedback information simultaneously; or If the sum of the bit number of the second feedback information and the bit number of the preprocessed first feedback information is more than the threshold, the user equipment transmits the first feedback information only, or a part of the second feedback information and the preprocessed first feedback information, wherein the sum of the bit number of the part of the second feedback information and the bit number of the preprocessed first feedback information is not more than the threshold, wherein the threshold is determined by configuration at the network side or protocol provisions.

Preferably, in the step 702, if the bit number of the second feedback information to be transmitted is not more than the bit number of the second feedback information which can be transmitted, the user equipment transmits the second feedback information and the preprocessed first feedback information simultaneously; or If the bit number of the second feedback information to be transmitted is more than the bit number of the second feedback information which can be transmitted, the user equipment transmits the first feedback information only, or a part of the second feedback information and the preprocessed first feedback information, wherein the bit number of the part of the second feedback information is not more than the bit number of the second feedback information which can be transmitted.

Preferably, the user equipment determines the bit number of the second feedback information which can be transmitted according to the step below:

the user equipment determines the bit number of the second feedback information which can be transmitted according to configuration at the network side or protocol provisions; or the user equipment takes an encoding bit number for transmitting the second feedback information in the PUCCH as the bit number of the second feedback information which can be transmitted; or the user equipment takes the product of the encoding bit number for transmitting the second feedback information in the PUCCH and a target code rate of the second feedback information as the bit number of the second feedback information which can be transmitted, wherein the target code rate of the second feedback information is determined by configuration at the network side or protocol provisions.

Preferably, the user equipment determines the encoding bit number for transmitting the second feedback information in the PUCCH according to the step below:

the user equipment takes the difference of a total encoding bit number for transmitting information in the PUCCH and an encoding bit number for transmitting the first feedback information in the PUCCH as the encoding bit number for transmitting the second feedback information in the PUCCH.

Preferably, the user equipment determines the encoding bit number for transmitting the first feedback information in the PUCCH according to the step below:

the user equipment determines the encoding bit number for transmitting the first feedback information in the PUCCH according to configuration at the network side or protocol provisions; or the user equipment divides the bit number of the preprocessed first feedback information by the target code rate of the first feedback information and floors the quotient, and takes the resulted value as the encoding bit number for transmitting the first feedback information in the PUCCH, wherein the target code rate of the first feedback information is determined by configuration at the network side or protocol provisions.

Preferably, the user equipment selects the part of the second feedback information to be transmitted according to the step below:

the user equipment selects the part of the second feedback information according to information priority.

Preferably, in step 702, the user equipment separately encodes and then transmits the second feedback information and the preprocessed first feedback information; or the user equipment jointly encodes and then transmits the second feedback information and the preprocessed first feedback information.

Preferably, in step 702, the user equipment transmits the non-preprocessed first feedback information if only the first feedback information is transmitted.

Figure 8:
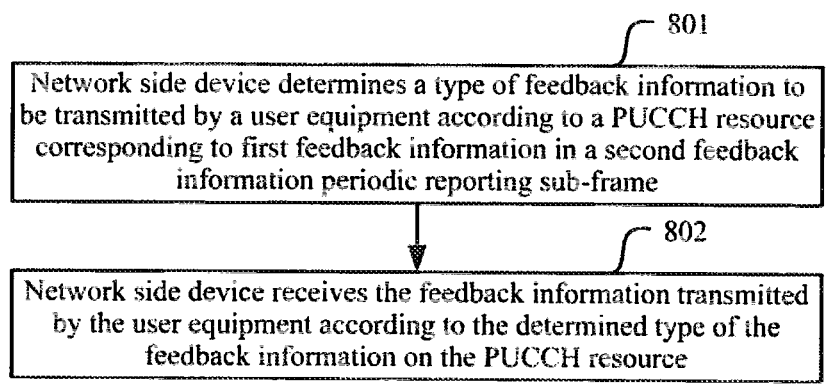
FIG. 8 is a flow chart of a method for receiving feedback information in an embodiment of the present invention.

As shown in FIG. 8, a method for receiving, feedback information in an embodiment of the present invention includes the following steps.

Step 801, a network side device determines a type of feedback information to be transmitted by a user equipment according to a PUCCH resource corresponding to first feedback information in a second feedback information periodic reporting sub-frame.

Step 802, the network side device receives the feedback information transmitted by the user equipment according to the determined type of the feedback information on the PUCCH resource.

Preferably, in step 801, the network side device determines the PUCCH resource corresponding to the first feedback information according to a configured transmission mode of the first feedback information for the user equipment and downlink data transmitted to the user equipment.

Preferably, in step 801, the network side device determines that the first feedback information is included in the type of the feedback information to be transmitted by the user equipment if the PUCCH resource corresponding to the first feedback information is a resource used by a large-capacity PUCCH;

wherein the large-capacity PUCCH includes: PUCCH format 2, PUCCH format 3 or PUCCH format with a bearing capacity not less than that of the PUCCH format 3.

Preferably, in step 801, the network side device determines that only the first feedback information is included in the type of the feedback information to be transmitted by the user equipment if the PUCCH resource corresponding to the first feedback information is a resource used by a small-capacity PUCCH or the first feedback information is transmitted using the mode of PUCCH format 1b with channel selection;

wherein the small-capacity PUCCH includes: PUCCH format 1a or PUCCH format 1b.

Preferably, in step 801, the network side device, before determining the type of the feedback information of the user equipment according to the PUCCH resource, configures that the first feedback information and the second feedback information can be transmitted by the user equipment simultaneously.

Preferably, the network side device determines that the first feedback information is preprocessed by the user equipment, when determining that the first feedback information and the second feedback information need to be transmitted by the user equipment simultaneously.

Preferably, before the network side device receives the feedback information transmitted by the user equipment, if the sum of the bit number of the second feedback information and the bit number of the preprocessed first feedback information is not more than a threshold, the network side device determines that the second feedback information and the preprocessed first feedback information are transmitted by the user equipment simultaneously;

if the sum of the bit number of the second feedback information and the bit number of the preprocessed first feedback information is more than the threshold, the network side device determines that the user equipment only transmits the first feedback information, or transmits a part of the second feedback information and the preprocessed first feedback information, wherein the sum of the bit number of the part of the second feedback information and the bit number of the preprocessed first feedback information is not more than the threshold, wherein the threshold is determined by configuration at the network side or protocol provisions.

Preferably, before the network side device receives the feedback information transmitted by the user equipment, if the bit number of the second feedback information to be transmitted is not more than the bit number of the second feedback information which can be transmitted, the network side device determines that the second feedback information and the preprocessed first feedback information are transmitted by the user equipment simultaneously; or if the bit number of the second feedback information to be transmitted is more than the bit number of the second feedback information which can be transmitted, the network side device determines that the user equipment only transmits the first feedback information, or transmits a part of the second feedback information and the preprocessed first feedback information, wherein the bit number of the part of the second feedback information is not more than the bit number of the second feedback information which can be transmitted.

Preferably, in step 801, the network side device determines the bit number of the second feedback information which can be transmitted according to the step below:

the network side device determines the bit number of the second feedback information which can be transmitted according to configuration at the network side or protocol provisions; or the network side device takes an encoding bit number for transmitting the second feedback information in the PUCCH as the bit number of the second feedback information which can be transmitted; or the network side device takes the product of the encoding bit number for transmitting the second feedback information in the PUCCH and a target code rate of the second feedback information as the bit number of the second feedback information which can be transmitted, wherein the target code rate of the second feedback information is determined by configuration at the network side or protocol provisions.

Preferably, in step 801, the network side device determines the encoding bit number for transmitting the second feedback information in the PUCCH according to the step below:

the network side device takes the difference of a total encoding bit number for transmitting information in the PUCCH and an encoding bit number for transmitting the first feedback information in the PUCCH as the encoding bit number for transmitting the second feedback information in the PUCCH.

Preferably, in step 801, the network side device determines the encoding bit number for transmitting the first feedback information in the PUCCH according to the step below:

the network side device determines the encoding bit number for transmitting, the first feedback information in the PUCCH according to configuration at the network side or protocol provisions; or the network side device divides the bit number of the preprocessed first feedback information by a target code rate of the first feedback information and floors the quotient, and takes the resulted value as the encoding bit number for transmitting, the first feedback information in the PUCCH, wherein the target code rate of the first feedback information is determined by configuration at the network side or protocol provisions.

Preferably, in step 801, the network side device selects the part of the second feedback information to be transmitted according to the step below:

the network side device selects the part of the second feedback information according to information priority.

Preferably, the network side device, before receiving the feedback information transmitted by the user equipment, determines that the non-preprocessed first feedback information is transmitted by the user equipment, when determining that only the first feedback information is transmitted by the user equipment.

FIG. 7 and FIG. 8 may be combined into one flow to form a method for transmitting feedback information, i.e., steps 701 and 702 are executed at first and then step 802 is executed, wherein there is no necessary sequence for step 801 as well as steps 701 and 702 except that all these steps are ensured to be executed before step 802.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable data processing device provide steps for performing the functions specified in the flows) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting feedback information, comprising:
    determining, by a user equipment, a physical uplink control channel (PUCCH) resource corresponding to first feedback information in a second feedback information periodic reporting sub-frame; and
    determining, by the user equipment, feedback information including the first feedback information to be transmitted according to the determined PUCCH resource, and transmitting the feedback information via the PUCCH resource corresponding to the first feedback information;

wherein the first feedback information is acknowledgement/negative-acknowledgement (ACK/NACK) information, and the second feedback information is Channel State Information (CSI);

wherein determining, by the user equipment, the feedback information to be transmitted comprises:

when the PUCCH resource corresponding to the first feedback information is a resource used by a large-capacity PUCCH, determining, by the user equipment, the first feedback information to be transmitted and the second feedback information to be transmitted as the feedback information; and wherein the large-capacity PUCCH comprises: PUCCH format 2, PUCCH format 3, or a PUCCH format with a bearing capacity not less than that of the PUCCH format 3;

before the user equipment transmits the first feedback information and the second feedback information simultaneously, the method further comprises:

preprocessing, by the user equipment, the first feedback information;

transmitting by the user equipment comprises:

when a sum of a bit number of the second feedback information and a bit number of the preprocessed first feedback information is not more than a threshold, transmitting, by the user equipment, the second feedback information and the preprocessed first feedback information simultaneously;

when the sum of the bit number of the second feedback information and the bit number of the preprocessed first feedback information is more than the threshold, transmitting, by the user equipment, the first feedback information only, or a part of the second feedback information and the preprocessed first feedback information, wherein a sum of a bit number of the part of the second feedback information and the bit number of the preprocessed first feedback information is not more than the threshold, wherein the threshold is determined by a configuration at a network side or protocol provisions.

2. The method according to claim 1, wherein determining, by the user equipment, the PUCCH resource comprises:
determining, by the user equipment, the PUCCH resource corresponding to the first feedback information according to a configured transmission mode of the first feedback information by the network side and received downlink data.

3. The method according to claim 1, wherein
when the PUCCH resource corresponding to the first feedback information is a resource used by a small-capacity PUCCH or the first feedback information is transmitted using a mode of PUCCH format 1b with channel selection, determining the first feedback information to be transmitted;
wherein the small-capacity PUCCH comprises: PUCCH format 1a or PUCCH format 1b.

4. The method according to claim 3, wherein before the user equipment determines the first feedback information to be transmitted and the second feedback information to be transmitted, the method further comprises:
determining, by the user equipment, the first feedback information and the second feedback information can be transmitted simultaneously according to the configuration at the network side.

5. The method according to claim 1, wherein before the user equipment preprocesses the first feedback information, the method further comprises:
determining, by the user equipment, the first feedback information needs to be preprocessed according to the configuration at the network side or protocol provisions.

6. The method according to claim 1, wherein the user equipment selects the part of the second feedback information to be transmitted by:
selecting, by the user equipment, the part of the second feedback information according to information priority.

7. The method according to claim 1, wherein transmitting, by the user equipment, the second feedback information and the preprocessed first feedback information simultaneously comprises:
separately encoding and then transmitting, by the user equipment, the second feedback information and the preprocessed first feedback information; or
jointly encoding and then transmitting, by the user equipment, the second feedback information and the preprocessed first feedback information.

8. The method according to claim 1, wherein transmitting, by the user equipment, the first feedback information only comprises:
transmitting, by the user equipment, a non-preprocessed first feedback information.

9. A method for transmitting feedback information, comprising:
determining, by a network side device, a type of feedback information to be transmitted by a user equipment according to a physical uplink control channel (PUCCH) resource corresponding to first feedback information in a second feedback information periodic reporting sub-frame; and
receiving, by the network side device, the feedback information transmitted by the user equipment according to the determined type of the feedback information on the PUCCH resource;
wherein the first feedback information is acknowledgement/negative-acknowledgement (ACK/NACK) information, and the second feedback information is Channel State Information (CSI);
wherein determining, by the network side device, the type of the feedback information to be transmitted by the user equipment comprises:
when the PUCCH resource corresponding to the first feedback information is a resource used by a large-capacity PUCCH, determining, by the network side device, that the first feedback information is included in the type of the feedback information to be transmitted by the user equipment; and
wherein the large-capacity PUCCH comprises: PUCCH format 2, PUCCH format 3, or a PUCCH format with a bearing capacity not less than that of the PUCCH format 3;
before the network side device receives the feedback information transmitted by the user equipment, the method further comprises:
determining, by the network side device, that the first feedback information is preprocessed by the user equipment, when determining that the first feedback information and the second feedback information need to be transmitted by the user equipment simultaneously;
when a sum of a bit number of the second feedback information and a bit number of the preprocessed first feedback information is not more than a threshold, determining, by the network side device, that the second feedback information and the preprocessed first feedback information are transmitted by the user equipment simultaneously;

when the sum of the bit number of the second feedback information and the bit number of the preprocessed first feedback information is more than the threshold, determining, by the network side device, that the user equipment only transmits the first feedback information, or a part of the second feedback information and the preprocessed first feedback information, wherein a sum of a bit number of the part of the second feedback information and the bit number of the preprocessed first feedback information is not more than the threshold, wherein the threshold is determined by a configuration at the network side device or protocol provisions.

10. The method according to claim 9, wherein the network side device determines the PUCCH resource by:
  determining, by the network side device, the PUCCH resource corresponding to the first feedback information according to a configured transmission mode of the first feedback information for the user equipment and downlink data transmitted to the user equipment.

11. The method according to claim 9, wherein
  when the PUCCH resource corresponding to the first feedback information is a resource used by a small-capacity PUCCH or the first feedback information is transmitted using a mode of PUCCH format 1b with channel selection, determining, by the network side device, that only the first feedback information is included in the type of the feedback information to be transmitted by the user equipment,
  wherein the small-capacity PUCCH comprises: PUCCH format 1a or PUCCH format 1b.

12. The method according to claim 9, wherein before the network side device determines the type of the feedback information of the user equipment according to the PUCCH resource, the method further comprises:
  configuring, by the network side device, that the first feedback information and the second feedback information can be transmitted by the user equipment simultaneously.

13. The method according to claim 9, wherein the network side device selects the part of the second feedback information to be transmitted by:
  selecting, by the network side device, the part of the second feedback information according to information priority.

14. The method according to claim 9, wherein before the network side device receives the feedback information transmitted by the user equipment, the method further comprises:
  determining, by the network side device, that a non-preprocessed first feedback information is transmitted by the user equipment, when determining that only the first feedback information is transmitted by the user equipment.

15. A user equipment for transmitting feedback information, comprising:
  a memory configured to store a computer readable program and a processor, wherein the processor is configured to execute the computer readable program to:
    determine a physical uplink control channel (PUCCH) resource corresponding to first feedback information in a second feedback information periodic reporting sub-frame; and
    determine feedback information including the first feedback information to be transmitted according to the determined PUCCH resource, and transmit the feedback information via the PUCCH resource corresponding to the first feedback information;
  wherein the first feedback information is acknowledgement/negative-acknowledgement (ACK/NACK) information, and the second feedback information is Channel State Information (CSI);
  wherein the processor configured to execute the computer readable program to determine the feedback information to be transmitted further comprises the processor configured to execute the computer readable program to:
    when the PUCCH resource corresponding to the first feedback information is a resource used by a large-capacity PUCCH, determining the first feedback information to be transmitted and the second feedback information to be transmitted as the feedback information; and
    wherein the large-capacity PUCCH comprises: PUCCH format 2, PUCCH format 3 or a PUCCH format with a bearing capacity not less than that of the PUCCH format 3;
  wherein the processor is further configured to execute the computer readable program to preprocess the first feedback information before the first feedback information and the second feedback information are transmitted simultaneously; and
  wherein the processor is further configured to execute the computer readable program to:
    transmit the second feedback information and the preprocessed first feedback information simultaneously when a sum of a bit number of the second feedback information and a bit number of the preprocessed first feedback information is not more than a threshold; and
    transmit the first feedback information only, or a part of the second feedback information and the preprocessed first feedback information, when the sum of the bit number of the second feedback information and the bit number of the preprocessed first feedback information is more than the threshold, wherein a sum of a bit number of the part of the second feedback information and the bit number of the preprocessed first feedback information is not more than the threshold;
  wherein the threshold is determined by a configuration at a network side or protocol provisions.

16. A network side device for transmitting feedback information, comprising:
  a memory configured to store a computer readable program and a processor, wherein the processor is configured to execute the computer readable program to:
    determine a type of feedback information to be transmitted by a user equipment according to a physical uplink control channel (PUCCH) resource corresponding to first feedback information in a second feedback information periodic reporting sub-frame; and
    receive the feedback information transmitted by the user equipment according to the determined type of the feedback information on the PUCCH resource;
  wherein the first feedback information is acknowledgement/negative-acknowledgement (ACK/NACK) information, and the second feedback information is Channel State Information (CSI);

wherein the processor configured to execute the computer readable program to determine the type of the feedback information to be transmitted by the user equipment further comprises the processor configured to execute the computer readable program to:
  when the PUCCH resource corresponding to the first feedback information is a resource used by a large-capacity PUCCH, determining that the first feedback information is included in the type of the feedback information to be transmitted by the user equipment;
  wherein the large-capacity PUCCH comprises: PUCCH format 2, PUCCH format 3 or a PUCCH format with a bearing capacity not less than that of the PUCCH format 3;
the processor is further configured to execute the computer readable program to determine that the first feedback information is preprocessed by the user equipment, when determining that the first feedback information and the second feedback information need to be transmitted by the user equipment simultaneously; and wherein the processor is further configured to execute the computer readable program to:
  determine that the second feedback information and the preprocessed first feedback information are transmitted by the user equipment simultaneously when a sum of a bit number of the second feedback information and a bit number of the preprocessed first feedback information is not more than a threshold; and
  determine that the user equipment only transmits the first feedback information, or a part of the second feedback information and the preprocessed first feedback information when the sum of the bit number of the second feedback information and the bit number of the preprocessed first feedback information is more than the threshold, wherein a sum of a bit number of the part of the second feedback information and the bit number of the preprocessed first feedback information is not more than the threshold;
  wherein the threshold is determined by configuration at the network side device or protocol provisions.

\* \* \* \* \*